(No Model.) 4 Sheets—Sheet 1.

F. C. OLIN.
GAS ENGINE.

No. 571,495. Patented Nov. 17, 1896.

Fig. 1.

Witnesses:
Theo. L. Popp
Henry L. Dick

Fred C. Olin
Inventor
By Wilhelm Bonner Attorneys (No Model.) 4 Sheets—Sheet 2.

F. C. OLIN.
GAS ENGINE.

No. 571,495. Patented Nov. 17, 1896.

Fig. 2.

Witnesses:
Theo. L. Popp
Henry L. Dick F. C. Olin
Inventor
By Wilhelm Bonner
Attorneys.

(No Model.) 4 Sheets—Sheet 3.

F. C. OLIN.
GAS ENGINE.

No. 571,495. Patented Nov. 17, 1896.

Witnesses:
Theo. L. Popp.
Henry L. Deck.

Fred C. Olin Inventor.
By Wilhelm Bonner
Attorneys.

(No Model.) 4 Sheets—Sheet 4.

F. C. OLIN.
GAS ENGINE.

No. 571,495. Patented Nov. 17, 1896.

Witnesses:
Theo. L. Popp
Henry L. Deck

F. C. Olin, Inventor
By Wilhelm Bonner, Attorneys

UNITED STATES PATENT OFFICE.

FRED C. OLIN, OF BUFFALO, NEW YORK.

GAS-ENGINE.

SPECIFICATION forming part of Letters Patent No. 571,495, dated November 17, 1896.

Application filed October 2, 1895. Serial No. 564,410. (No model.)

*To all whom it may concern:*

Be it known that I, FRED C. OLIN, a citizen of the United States, residing at Buffalo, in the county of Erie and State of New York, have invented a new and useful Improvement in Gas-Engines, of which the following is a specification.

This invention relates to that class of gas-engines in which a working impulse may be produced during every alternate forward stroke of the piston.

My invention has the object to improve the valve mechanism whereby the fuel supply and the exhaust are controlled, to provide a simple and reliable means for governing the speed of the engine, and to simplify and improve the mechanism for operating the electric igniter.

In the accompanying drawings, consisting of four sheets.

Like letters of reference refer to like parts in the several figures.

A represents the hollow bed resting on a pedestal $a$ and provided at its front end with an opening $a'$ for the admission of air into the hollow bed. B represents the working cylinder arranged horizontally upon the front portion of the bed and provided with an open rear end and a closed front end. C represents the piston arranged in the cylinder; D, the crank-shaft journaled in bearings $d$ on the bed; $d'$, the pitman connecting the crank-shaft with the piston, and $d^2$ the balance-wheels mounted on the crank-shaft.

E, Figs. 2, 3, 4, 5, and 7, represents a valve-chest which is secured lengthwise to one side of the working cylinder and which contains the valve mechanism for controlling the fuel supply and the exhaust of the engine. This chest is provided in its front portion with a valve-chamber $e$, in its central portion with an exhaust-chamber F, connected at its front end with the valve-chamber by an opening $f$, and in its rear portion with a fuel-chamber G, which is connected by an opening $g$ with the rear end of the exhaust-chamber and provided in its rear end with a guide-opening $g'$. The valve-chamber communicates by means of a transverse passage $e'$ with the front end of the working cylinder. $f'$ represents an exhaust passage or port opening with its outer end into the exhaust-chamber and opening with its inner end into the working cylinder at a point in front of the piston when the latter is at the end of its forward movement. $f^2$ is an exhaust-pipe, which is connected with the exhaust-chamber, and whereby the products of combustion are carried off.

H, Figs. 2, 3, 4, 5, 6, and 7, represents a hollow reciprocating valve-stem which is arranged lengthwise in the valve-chest so as to pass through the exhaust and fuel chambers and terminates with its front end in the valve-chamber, while its rear portion projects through the guide-opening $g'$ beyond the rear end of the valve-chest.

The valve-stem is guided with its front portion in the opening $f$, connecting the exhaust and valve chambers, said opening being provided with by-passes or exhaust-openings $f^3$, so as to permit of establishing communication between these chambers. The central portion of the valve-stem is fitted in the opening $g$, connecting the exhaust and fuel chambers, so as to permit the same to slide therein, but prevent communication between said chambers. The rear portion of the valve-stem is provided with a sleeve $g^2$, which fits in the guide-opening $g'$ so as to slide therein, but prevent the escape of fuel.

Figure 7:
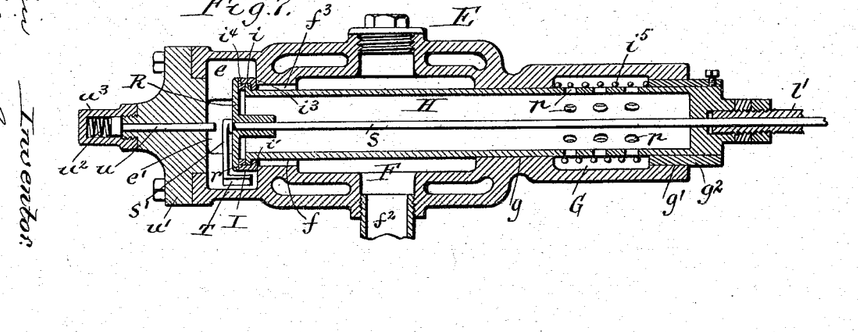
Fig. 7 is a vertical longitudinal section of the valve mechanism, on an enlarged scale, in line 7 7, Fig. 2.
Figure 8:
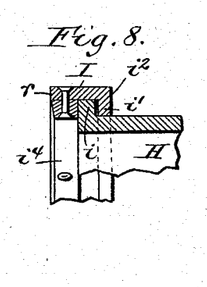
Fig. 8 is a fragmentary section, on an enlarged scale, of the outlet portion of the hollow valve-stem forming part of the valve mechanism.

The exhaust-openings $f^3$ are controlled by an exhaust-valve which is constructed as follows: I, Figs. 7 and 8, represents a valve-ring surrounding an external annular flange $i$ on the front end of the valve-stem and provided with an internal annular flange $i'$, which bears with its front side against the rear side of the stem-flange. The valve-ring is provided on its rear side with an exhaust-valve face $i^2$, which is adapted to bear against a valve-seat $i^3$, formed on the rear side of the valve-chamber around the exhaust-openings $f^3$, so as to close these openings. The valve-ring is fitted loosely on the valve-stem, so as to permit it to adjust itself freely to the valve-seat $i^3$, and is confined on the stem by means of a fastening or retaining ring $i^4$, secured to the inner side of the valve-ring in front of the flange of the valve-stem, as shown in Figs. 7 and 8. While the piston is moved forward with a working stroke by the expansion of the ignited charge of fuel and during the initial portion of the subsequent backward movement or exhaust-stroke the exhaust-valve is closed. During the last portion of the forward movement and the first portion of the backward movement of the piston the latter uncovers the exhaust-port $f'$ in the cylinder, thereby permitting a portion of the products of combustion after each working stroke of the piston to escape through the exhaust. As the piston closes the exhaust-port in its return movement the exhaust-valve is opened and the remainder of the products of combustion is forced into the exhaust-chamber by the piston, and at the end of the backward movement of the latter the exhaust-valve is again closed. The exhaust-valve is normally held in a closed position by a heavy spring $i^5$, surrounding the valve-stem and bearing with its ends against the front side of the fuel-chamber and the front end of the guide-sleeve $g^2$.

J, Figs. 2, 9, 10, 11, and 17, represents an exhaust-cam whereby the exhaust-valve is opened and which is provided with a salient portion $j$, extending about one-quarter around the face of the cam and adapted to hold the exhaust-valve open, and a receding portion $j'$, extending about three-quarters around the face of the exhaust-cam and adapted to permit the exhaust-valve to close. This cam is arranged on a supporting-wheel K, which is journaled on an arbor $k$, secured to one side of the bed and provided with a gear-rim $k'$, which meshes with a pinion $k^2$, secured to the crank-shaft. The relative sizes of the gear-rim and pinion are such that the supporting-wheel is turned one revolution during every two revolutions of the crank-shaft, whereby the exhaust-valve under ordinary conditions is only opened during every alternate backward stroke of the piston.

L is a rock-arm pivoted at its lower end on the bed, so as to swing in a vertical plane lengthwise of the engine, and provided at its upper end with a roller or bearing-piece $l$, which bears against the exhaust-cam. $l'$ is a connecting-rod connected at its front end with the rear end of the hollow valve-stem and provided at its rear end with a yoke $l^2$, having a knuckle $l^3$, which fits into a socket $l^4$ in the front side of the rock-arm.

Figure 1:
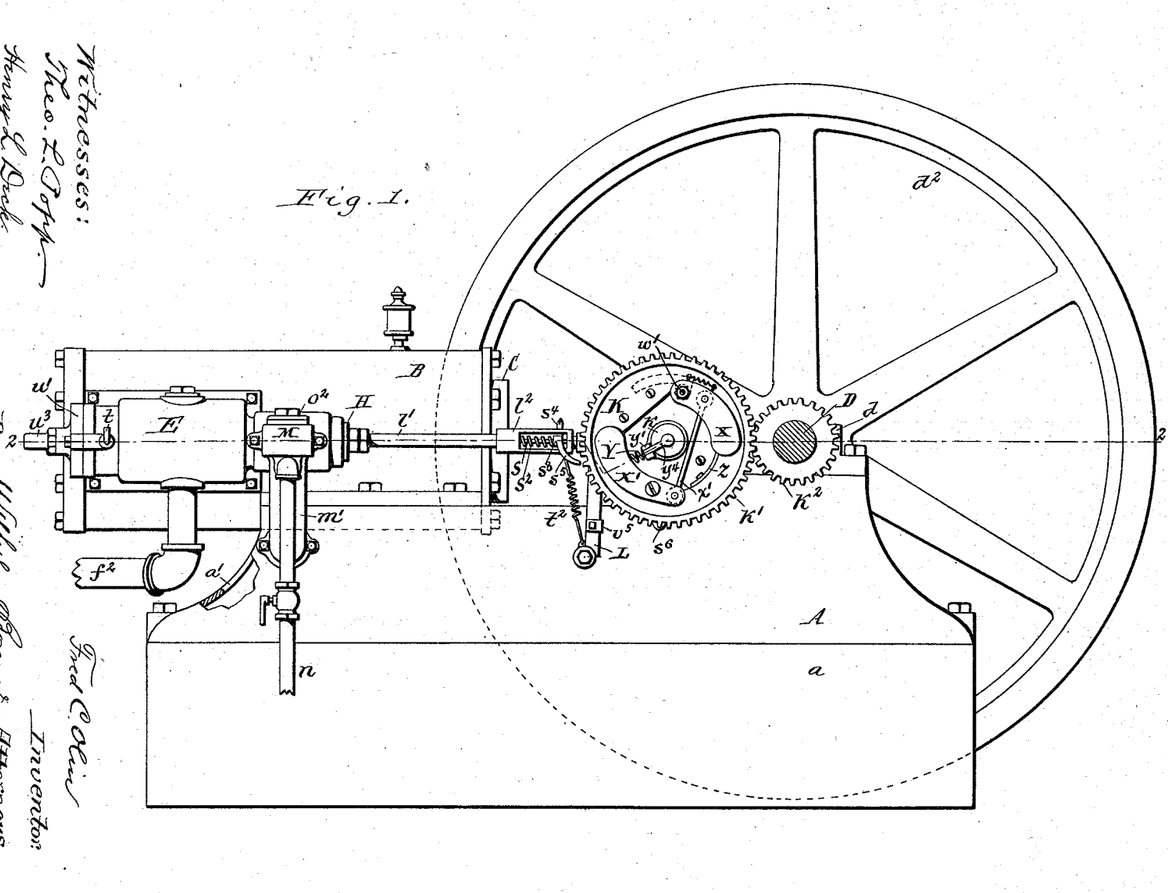
Figure 1 is a side elevation of my improved gas-engine, partly in section.
Figure 2:
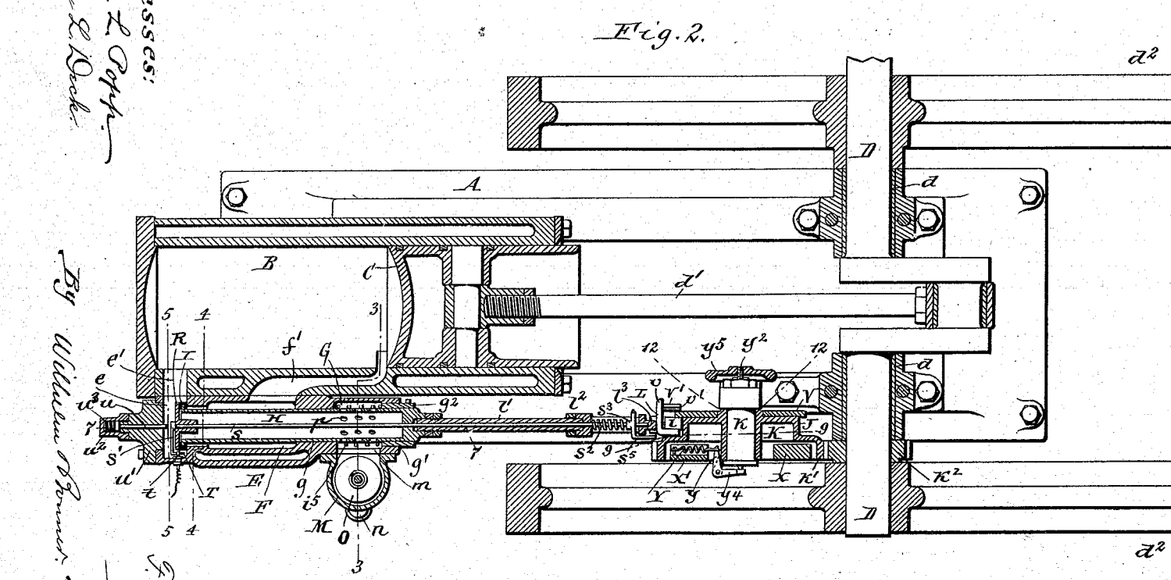
Fig. 2 is a horizontal section thereof in line 2 2, Fig. 1.
Figure 3:
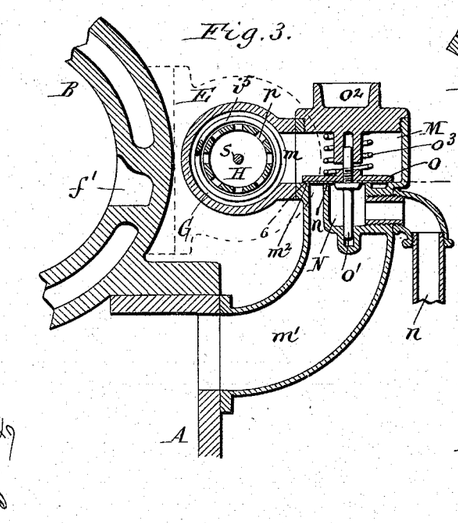
Figs. 3, 4, and 5 are fragmentary vertical transverse sections, on an enlarged scale, in lines 3 3, 4 4, and 5 5, Fig. 2, respectively.
Figures 4, 5, 6:
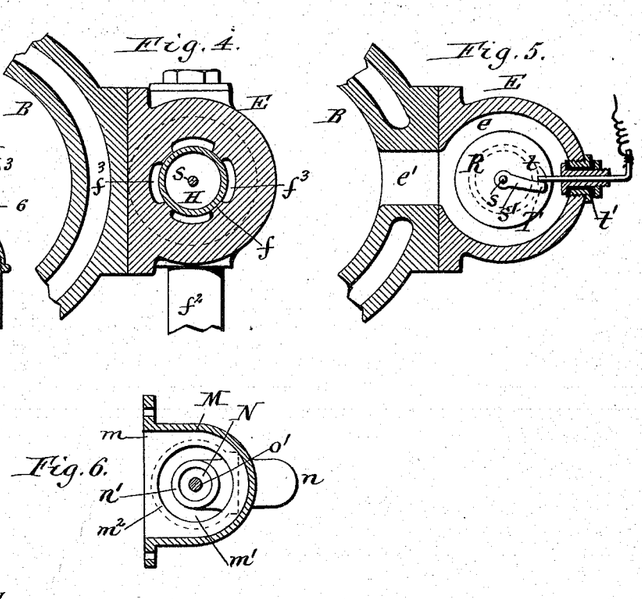
Fig. 6 is a horizontal section in line 6 6, Fig. 3.
Figures 9, 10, 11, 12, 13, 14, 15, 16, 17:
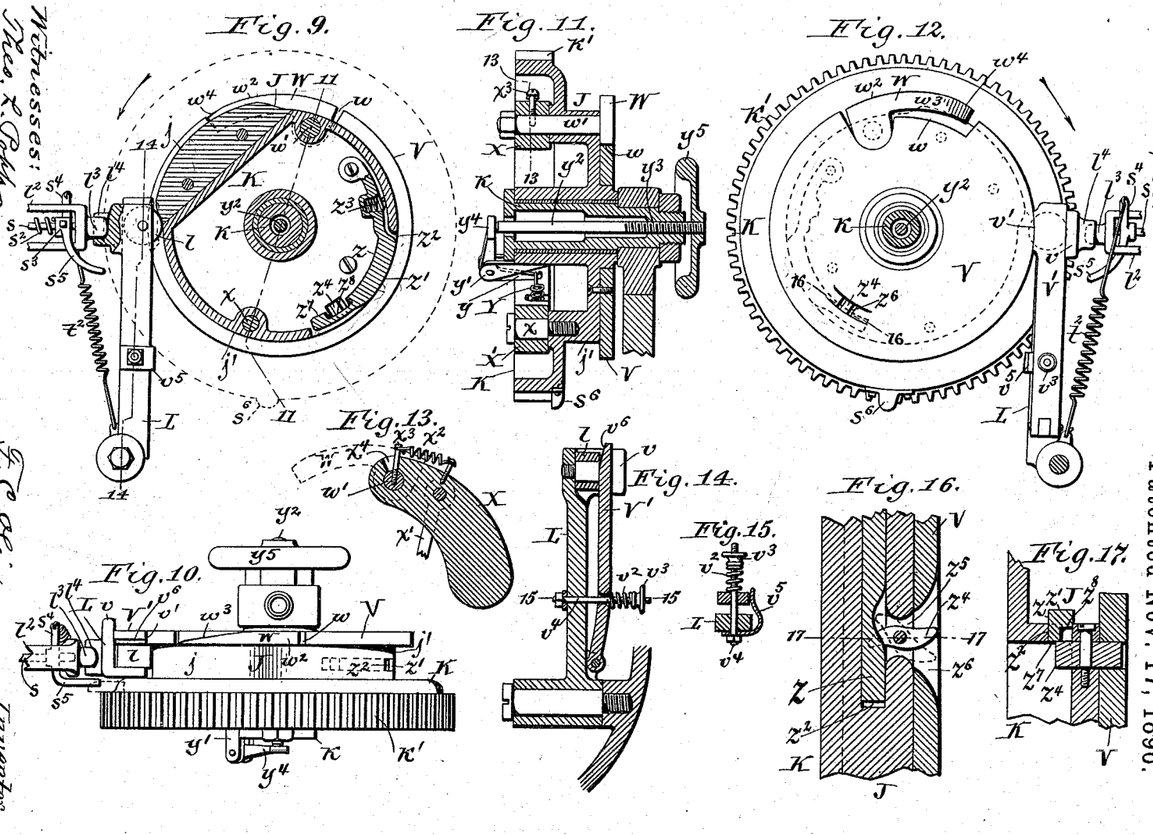
Fig. 9 is a vertical longitudinal section, on an enlarged scale, of the governor and adjacent parts, taken in line 9 9, Fig. 2, and showing the parts in the position preparatory to opening the exhaust.
Fig. 10 is a top plan view of the same.
Fig. 11 is a vertical transverse section in line 11 11, Fig. 9.
Fig. 12 is a vertical longitudinal section, on an enlarged scale, of the governor and adjacent parts taken in line 12 12, Fig. 2, and showing the parts in the position when the exhaust is open.
Fig. 13 is a vertical longitudinal section in line 13 13, Fig. 11.
Fig. 14 is a vertical transverse section in line 14 14, Fig. 9.
Fig. 15 is a horizontal section in line 15 15, Fig. 14.
Fig. 16 is a transverse section, on an enlarged scale, in line 16 16, Fig. 12, showing the starting-cam in an operative position.
Fig. 17 is a transverse section in line 17 17, Fig. 16.

Fuel is introduced into the firing-space of the working cylinder by the following means: M, Figs. 2, 3, and 6, represents a check-valve chamber communicating by a lateral passage $m$ with the fuel-chamber and having its bottom connected by an air-supply pipe $m'$ with the hollow bed. N represents a gas-chamber arranged in the upper portion of the air-pipe and having its inlet extending laterally through the air-pipe and connecting with a gas-supply pipe $n$, while its outlet opens upwardly into the check-valve chamber. The air-supply pipe is provided around its outlet with a valve-seat $m^2$, and the gas-chamber is provided around its outlet with a similar valve-seat $n'$, arranged in line or nearly so with the valve-seat of the air-pipe. O represents a check-valve which is adapted to bear against the valve-seats of both the air-pipe and gas-chamber and simultaneously open or close the air and gas supply. This valve is secured to a vertically-movable stem $o'$, which is guided with its lower end in the bottom of the gas-chamber and with its upper end in a cap $o^2$, which closes the top of the check-valve chamber. The check-valve is normally held against its seats by a spring $o^3$. $p$ represents radial openings which are formed in the valve-stem within the fuel-chamber and which permit the gas and air to pass from said chamber into the hollow valve-stem. R, Figs. 2, 5, and 7, is a main fuel-valve whereby the passage of air and gas from the valve-stem to the working cylinder is controlled. This valve is arranged in the valve-chamber in front of the valve-stem and is adapted to bear against a valve-seat $r$, formed on the front side of the valve-ring I. The main fuel-valve is mounted loosely on the front end of a reciprocating and oscillating shifting rod $s$, which passes lengthwise through the valve-stem and connecting-rod and is guided with its rear portion in the yoke $l^2$. The fuel-valve is normally held in a closed position by the hub of a rock-arm $s'$, secured to the shifting rod and bearing against the front side of the valve, and a light spring $s^2$, bearing with its ends against the yoke and the hub of a rock-lever $s^3$, secured to the shifting rod, as represented in Figs. 1, 2, and 9, whereby the latter is drawn rearwardly and the fuel-valve is held against its seat. During the forward movement of the piston following the discharge of the products of combustion the exhaust-valve is closed by the heavy spring $i^5$, and the fuel-valve is first withdrawn from its seats against the resistance of the light spring $s^2$ by the suction of the piston, and the check-valve is then likewise withdrawn from its seat by the same suction, thereby causing a charge of air and gas to be drawn through the check-valve chamber, fuel-chamber, hollow valve-stem, and valve-chamber into the firing-space of the working cylinder. At the end of the forward suction-stroke of the piston the fuel and check valves are automatically closed by their springs and during the subsequent backward movement of the piston the latter compresses the charge of fuel.

By employing a hollow valve-stem through which the fuel passes on its way to the cylinder and arranging the valve-stem in the exhaust-chamber the valve-stem is prevented from becoming heated excessively by the products of combustion, and the temperature of the gaseous fuel is in turn raised, thereby improving its condition for ignition and combustion. This construction and arrangement of the hollow valve-stem is also desirable when gasolene or other liquid fuel is used instead of gas, in which case the hollow valve-stem exposed to the heat in the exhaust-chamber serves to vaporize the gasolene preparatory to delivering the same into the cylinder.

At the end of the backward movement of the piston the compressed charge of fuel is ignited by an electric igniter which is constructed as follows: T, Figs. 2, 5, and 7 is a contact or finger arranged on the free end of the rock-arm $s'$ and forming one of the terminals of an electric generator. $t$ is a contact or rod which is arranged with its inner end above the contact-finger in the path of the latter and connected with its outer end to the opposite terminal of the electric generator. The contact-rod is mounted in an insulated support $t'$, which is secured in the side of the valve-chest. The contact-finger is normally held in contact with the rod $t$ by means of a spring $t^2$, secured with its ends to the lower portion of the rock-arm L and the inner arm $s^4$ of the rock-lever $s^3$. The outer arm $s^5$ of the rock-lever $s^3$ projects into the path of a cam or tappet $s^6$, secured to the supporting-wheel, and when this tappet strikes the outer arm of the rock-lever the shifting rod is turned and the contact-finger is moved out of contact with the contact-rod, thereby producing an electric spark, whereby the compressed charge of fuel in the cylinder is ignited and the piston is impelled forward with a working impulse.

When the engine is running with a normal speed, the roller of the exhaust rock-arm is permitted to pass from the salient portion of the exhaust-cam to the receding portion thereof, so that the exhaust will be closed during each forward suction-stroke of the piston, thereby causing the piston to draw a new charge of fuel into the cylinder for producing a working impulse during each working stroke thereof. If the speed of the engine is above the normal, the exhaust-valve is held open by an automatic regulator mechanism during the suction-stroke of the piston, which causes the piston to draw backwardly through the exhaust without drawing in any fuel through the valve-stem, and during the subsequent backward compression-stroke the air which has previously been drawn into the cylinder through the exhaust is again expelled through the exhaust, thereby preventing a charge of fuel from being present in the cylinder and ignited during the next working stroke of the piston, whereby the speed of the engine is reduced accordingly.

In order to prevent the piston during its forward stroke from withdrawing the fuel-valve from its seat while the exhaust-valve is being held open by the regulator mechanism, the fuel-valve in being carried forward with the exhaust-valve is caused to bear against the rear end of a holding or retaining rod $u$, whereby the fuel-valve is held shut. This rod is arranged to slide lengthwise through the cap $u'$, closing the front end of the valve-chest, and is yieldingly held in its rearmost position by a spring $u^2$, arranged in a socket $u^3$, secured to the cap $u'$ and bearing with its ends against the bottom of the socket and the head of the holding-rod.

The regulator mechanism for controlling the exhaust-valve and the speed of the engine is constructed as follows: V, Figs. 9, 10, 11, 12, 16, and 17, represents a rider-disk which is adapted to hold the exhaust-valve open during the suction-stroke of the piston, so that no fuel will be drawn into the firing-space when the speed of the engine is above the normal. This disk is secured concentrically to the supporting-wheel adjacent to the inner side of the exhaust-cam. $V'$ represents a trip or regulator pawl whereby the roller of the exhaust rock-arm is held out of engagement with the receding portion of the exhaust-cam for holding the exhaust open when the speed of the engine is abnormally high. This pawl is pivoted on the lower portion of the exhaust rock-arm so as to swing transversely thereto and bears with its upper front side against a lug $v$, formed on the upper portion of the exhaust rock-arm adjacent to its roller. The upper portion of the pawl is provided on its rear side with a curved face $v'$, which is adapted to bear upon the peripheral face or edge of the rider-disk or to clear the same. The upper end of the trip-pawl is yieldingly moved outwardly with reference to the center line of the engine into engagement with the face of the rider-disk by a spring $v^2$, bearing with its ends against the inner side of the pawl, and a screw-nut $v^3$, arranged on a rod $v^4$, which is secured to the exhaust rock-arm, as shown in Figs. 14 and 15. The relative position of the face of the rider-disk and the face of the regulator-pawl is such that when the exhaust rock-arm is moved forward to its fullest extent by the salient portion of the exhaust-cam during each revolution of the supporting-wheel the pawl is moved forward sufficiently to permit the same to be moved outwardly by the spring $v^2$, so that its face stands over and engages with the face of the rider-disk.

When the rock-arm reaches the end of its forward movement, the space between its lug $v$ and the face of the rider-disk is just sufficient to permit the pawl to move freely outward over the face of the rider-disk, and in order to insure this outward movement of the pawl at this time the latter is firmly held against the lug $v$ of the rock-arm by a spring $v^5$, secured to said arm, thereby preventing any looseness in the pivot of the pawl from displacing the latter and interfering with its engagement with the face of the rider-disk, which otherwise would occur if the pawl were displaced and would not be moved forwardly sufficient to clear the face of the rider-disk.

W, Figs. 9, 10, 11, and 12, represents a vibrating trip-cam or switch, whereby the regulator-pawl is disengaged from the face of the rider-disk to permit of closing the exhaust-valve when the speed of the engine is normal or allowed to remain in engagement with said face for holding the exhaust open when the speed of the engine is above the normal. This cam is arranged in a recess $w$, formed in the face of the rider-disk adjacent to the salient portion of the exhaust-cam, and is secured with its rear portion to a wrist-pin $w'$, which is pivoted transversely in the supporting-wheel. The trip-cam is provided with an outercurved face $w^2$, which is substantially of the same radius as the face of the rider-disk, and an inclined face $w^3$, arranged on the inner side thereof and extending inwardly and rearwardly from the front end of the pawl to the pivot thereof. During the normal speed of the engine the trip-cam projects outwardly beyond the face of the rider-disk, which causes the inclined side of the trip-cam to engage with an inclined face $v^6$ on the regulator-pawl and move the latter inwardly and out of engagement with the face of the rider-disk, thereby permitting the roller of the exhaust rock-arm to pass from the salient to the receding portion of the exhaust-cam and closing the exhaust-valve. While the engine is running above a normal speed the trip-cam is retracted into the recess of the rider-disk, so that its outer face forms practically a continuation of the face of the rider-disk, which causes the regulator-pawl to remain with its face in engagement with the face of the rider-disk, thereby preventing the roller of the exhaust rock-arm form following the receding portion of the exhaust-cam, whereby the exhaust-valve is held open until the trip-cam is again projected beyond the face of the rider-disk, when the normal operation of the exhaust-valve is restored.

X X', Figs. 1, 2, 11, and 13, represent two centrifugal weight-levers whereby the position of the trip-cam is controlled. The weight-levers are arranged on the outer side of the supporting-wheel on opposite sides of the arbor, one of the levers X being mounted with its front end on the outer end of the wrist-pin $w'$ of the trip-cam and projecting in a diametrically opposite direction from the trip-cam, while the other weight-lever is pivoted between its front and rear ends on a wrist-pin $x$, secured to the supporting-wheel diametrically opposite the wrist-pin $w'$. $x'$ represents a rod connecting the central portion of the weight-lever X with the front end of the weight-lever X', whereby the weight-levers are caused to move simultaneously toward and from the center of the supporting-wheel. Upon rotating the supporting-wheel the weight-levers are moved outwardly by centrifugal force and the trip-cam is moved inwardly. When the speed of the engine is normal, the outward movement of the weight-lever is such as to allow the trip-cam to project beyond the face of the rider-disk, so that the regulator-pawl will be thrown off the face of the rider-disk to permit the exhaust-valve to be closed. If the speed of the engine is above the normal, the weight-levers are moved outwardly to such an extent that the trip-cam is moved inwardly until its face is flush with the face of the rider-disk, whereby the regulator-pawl is allowed to remain on the face of the rider-disk and the exhaust-valve is prevented from closing. The front end of the trip-cam is chamfered, as shown at $w^4$, which prevents the regulator-pawl from striking abruptly against the front end of the trip-cam when the latter is only moved slightly beyond the face of the rider-disk, but enables the pawl to ride over the trip-cam for holding the exhaust open.

In order to prevent injury to the trip-cam and connecting parts by the sudden pressure of the regulator-pawl against the trip-cam in running over the same, the latter is yieldingly connected with the weight-levers by means of a spring $x^2$, secured with one end to the weight-lever X and with its other end to a screw or pin $x^3$, secured to the wrist-pin $w'$ and passing through a radial slot $x^4$ in the weight-lever, as shown in Fig. 13. In the ordinary operation of the engine the pin $x^3$ is held against the rear end of the slot $x^4$ and the trip-cam and weight-lever move together, but when the regulator-pawl presses suddenly against the trip-cam the spring $x^2$ is strained and the trip-cam for a time moves independently of the weight-lever.

Y, Figs. 1, 2, and 11, represents a regulator-spring whereby the trip-cam is moved outwardly into its normal operative position. This spring is secured with one end to the rear end of the weight-lever X' and with its opposite end to one arm $y$ of an elbow-lever. This lever is pivoted on ears $y'$, formed on the hub of the supporting-wheel. $y^2$ is a screw-adjusting rod whereby the tension of the regulator-spring may be adjusted. This rod is arranged in a screw-threaded opening $y^3$, formed axially in the arbor and engaging with its outer end against the other arm $y^4$ of the elbow-lever. $y^5$ is a hand-wheel secured to the inner end of the adjusting-rod, whereby the latter may be turned for adjusting the tension of the regulator-spring and varying the normal speed of the engine. By arranging the adjusting-rod axially in the arbor the speed of the engine may be varied while the engine is running.

The first charge of fuel for starting the engine is compressed in the cylinder by turning the crank-shaft by hand, and in order to reduce the power necessary to effect this compression the exhaust-valve is held open during the first portion of the compression-stroke of the piston, whereby a portion of the fuel is expelled through the exhaust, after which the exhaust is closed, so that only a portion of the fuel is compressed during the final portion of the compression-stroke of the piston.

The mechanism for holding the exhaust-valve open during the initial compression-stroke of the piston is constructed as follows:

$z$ represents a movable starting-cam pivoted at one end on the front side of the supporting-wheel and projecting with its face $z'$ through an opening $z^2$ in the face of the receding portion of the exhaust-cam nearly diametrically opposite the salient portion thereof. When the engine is running, the face of the starting-cam is retracted and arranged flush with the face of the exhaust-cam and is yieldingly held in this position by a spring $z^3$, interposed between the starting-cam and the inner side of the supporting-wheel.

When it is desired to start the engine, the starting-cam is projected with its face extending beyond the face of the exhaust-cam, whereby the starting-cam is caused to move the exhaust rock-lever forwardly for opening the exhaust-valve during a part of the compression-stroke of the piston. The starting-cam is held in its projected position by means of a turn-button $z^4$, pivoted in a recess $z^5$ in the web of the supporting-wheel and projecting with its inner end through an opening $z^6$ in the rider-disk and bearing with its outer end against the back of the starting-cam. The back of the starting-cam is provided with two shoulders or stop-faces $z^7 z^8$, which are arranged at different distances from the face of the starting-cam and against which the outer end of the turn-button is adapted to bear for holding the starting-cam in its projected position or for limiting its inward movement. The stop-face $z^7$ is formed by the back of the starting-cam, while the stop-face $z^8$ is formed by the bottom of a notch or recess in the back of the starting-cam. When it is desired to render the starting-cam operative, the latter is projected and the outer arm of the turn-button is engaged with the stop-face $z^7$, arranged farthest from the face of the starting-cam, whereby the latter is held in its projected position, as represented in full lines, Figs. 16 and 17. After the engine has been started the operator places his hand against the inner end of the turn-button and turns the same until the outer end of the turn-button enters the recess, when the starting-cam will be retracted by the spring $z^3$ until the stop-face $z^8$ of the starting-cam strikes the outer end of the turn-button.

After the engine has been started the operation is as follows: When the piston reaches the end of its forward compression-stroke, the previously-introduced charge of fuel in the cylinder is ignited, thereby driving the piston forward with a working stroke. During the last portion of the working stroke of the piston the exhaust-passage is uncovered by the piston and a portion of the products of combustion escape to the exhaust-chamber. After the exhaust-passage is covered again by the piston, during the subsequent exhaust-stroke thereof, the exhaust-valve is opened and the balance of the products of combustion are discharged through the same by the piston in completing the exhaust-stroke. After the piston has reached the end of its exhaust-stroke the exhaust-valve is closed, and during the subsequent forward or suction stroke of the piston the fuel and check-valves are withdrawn from their seats and the fuel is drawn into the firing-space of the cylinder behind the piston, and at the end of this stroke the fuel and check valves are closed. The charge of fuel is compressed during the following backward or compression stroke of the piston, and when the latter has arrived at the end of this stroke the igniter produces a spark which fires the compressed charge of fuel and impels the piston forward with another working stroke.

I claim as my invention—

1. The combination with the cylinder and the piston, of a valve-chamber connected with the cylinder, an exhaust-chamber connected with the valve-chamber, a hollow valve-stem arranged in said valve and exhaust chambers and communicating with a fuel supply, an exhaust-valve mounted on the inner end of the valve-stem, actuating mechanism whereby the hollow valve-stem is moved inwardly for opening the exhaust-valve and outwardly for closing the same, a fuel-valve adapted to move toward and from the valve-stem and actuating mechanism whereby the fuel-valve is moved inwardly for opening the same and outwardly for closing the same, substantially as set forth.

2. The combination with the cylinder and the piston, of a valve-chamber connecting with the cylinder, and exhaust-chamber connected with the valve-chamber by an opening provided with by-passes, a hollow valve-stem guided in said opening and an exhaust-valve mounted on said valve-stem, substantially as set forth.

3. The combination with the cylinder and the piston, of an exhaust-chamber connected with the cylinder, a hollow valve-stem arranged in said chamber and communicating with the cylinder and with a fuel supply, and an exhaust-valve loosely mounted on said stem, substantially as set forth.

4. The combination with the cylinder and the piston, of a valve-chamber connecting with the cylinder, an exhaust-chamber connecting with the valve-chamber, a hollow valve-stem arranged in the valve and exhaust chambers, a valve-ring arranged on the valve-stem within the valve-chamber and provided on its rear side with an exhaust-valve face which is adapted to bear against an exhaust-valve seat surrounding the valve-stem, and a fuel-valve adapted to bear against a fuel-valve seat formed on the front side of the valve-ring, substantially as set forth.

5. The combination with the cylinder and the piston, of a valve-chamber connecting with the cylinder, an exhaust-chamber connecting with the valve-chamber, a hollow valve-stem arranged in the valve and exhaust chambers and provided with an external annular flange, a valve-ring surrounding the external flange and having an exhaust-valve face on its rear side which is adapted to bear against an exhaust-valve seat surrounding the valve-stem, an external flange formed on the valve-stem, an internal flange formed on the valve-ring and bearing against the rear side of the external flange of the valve-stem, a retaining-ring secured to the inner side of the valve-ring and arranged in front of the external flange, and a fuel-valve adapted to bear against a fuel-valve seat formed on the front side of the valve-ring, substantially as set forth.

6. The combination with the cylinder and the piston, of an exhaust-chamber connected with said cylinder, a hollow valve-stem arranged in said chamber and provided with an exhaust-valve, actuating mechanism whereby the valve-stem is moved inwardly for opening the exhaust-valve and outwardly for closing the same, a fuel-valve which is adapted to move toward and from a valve-seat on the valve-stem and capable of moving inwardly with the valve-stem without opening the fuel-passage during the operation of opening the exhaust, and a yielding holding finger or rod adapted to bear against the fuel-valve and hold the same against its seat during the inward movement of the valve-stem, substantially as set forth.

7. The combination with the cylinder and the piston, of a valve-chamber connected with the cylinder and provided on one side with a head, an exhaust-chamber connected with the opposite side of the valve-chamber, a reciprocating hollow valve-stem arranged in said valve and exhaust chambers and provided with an exhaust-valve, a valve-rod arranged within the hollow valve-stem and provided with a fuel-valve adapted to bear against a seat on the hollow valve-stem, a spring engaging with said valve-rod for holding the fuel-valve yieldingly against its seat, a separate holding finger or rod guided in said head and adapted to bear against the fuel-valve and a spring whereby the holding finger or rod is yieldingly held in its projected position, substantially as set forth.

8. The combination with the cylinder and the piston, of an exhaust-chamber connecting with the cylinder, a hollow valve-stem arranged in said chamber and connected with a fuel supply, an exhaust-valve mounted on said stem, an inwardly-opening check-valve arranged in the fuel supply, and an inwardly-opening fuel-valve arranged on the valve-stem between the check-valve and cylinder, said check and fuel valves being adapted to be opened inwardly by the suction of the piston, substantially as set forth.

9. The combination with the cylinder and the piston, of an exhaust-chamber connecting with the cylinder, a hollow valve-stem arranged in said chamber and carrying an exhaust-valve, a check-valve chamber communicating with the hollow valve-stem, an air-supply pipe opening into the check-valve chamber and provided with a valve-seat, a gas-supply pipe opening into the check-valve chamber and provided with a valve-seat, and a check-valve adapted to bear upon the seats of the air and gas supply pipes, substantially as set forth.

10. The combination with the cylinder and the piston, of a chest provided with a valve-chamber connected with the cylinder and an exhaust-chamber connecting with the valve-chamber, a valve-stem arranged in said valve and exhaust chambers and carrying an exhaust-valve, a stationary contact arranged within the valve-chamber and connected with one terminal of an electric generator and a shifting rod arranged in the valve-stem and provided with a movable contact which forms the other terminal of the electric generator and which is adapted to bear against the stationary contact, substantially as set forth.

11. The combination with the cylinder and the piston, of a chest provided with a valve-chamber connected with the cylinder and an exhaust-chamber connecting with the valve-chamber, a longitudinally-reciprocating valve-stem arranged in said valve and exhaust chambers and carrying an exhaust-valve, a stationary contact arranged within the valve-chamber and connected with one terminal of an electric generator, a shifting rod arranged in the valve-stem and having a longitudinally-reciprocating movement with said valve-stem and a rotary movement independent of said stem, a movable contact secured to the shifting rod, adjacent to the stationary contact, and connected with the opposite terminal of the electric generator, a rock-lever secured to said shifting rod, a spring connected with said lever for turning the shifting rod in one direction and holding the movable contact in engagement with the stationary contact and a cam adapted to engage with said rock-lever for turning the shifting rod in the opposite direction for disengaging the movable contact from the stationary contact, substantially as set forth.

12. The combination with the cylinder, the piston and the exhaust-valve, of a roller or bearing-piece connected with the exhaust-valve, an exhaust-cam engaging with said roller or bearing-piece and having a salient portion which opens the exhaust-valve and a receding portion which permits the exhaust-valve to be closed, a rider-disk arranged adjacent to the exhaust-cam, a movable regulator-pawl adapted to engage with the face of the rider-disk for holding the roller or bearing-piece out of engagement with the receding portion of the exhaust-cam, and a movable trip-cam whereby the regulator-pawl is disengaged from the face of the rider-disk for permitting the roller or bearing-piece to engage with the receding portion of the exhaust-cam and closing the exhaust-valve, substantially as set forth.

13. The combination with the cylinder, the piston and the exhaust-valve, of a rock-arm connected with the exhaust-valve and provided with a roller or bearing-piece, a rotary exhaust-cam engaging with said roller or bearing-piece and having a salient portion for moving said rock-arm forward and opening the exhaust-valve and a receding portion which permits the rock-arm to move backwardly for opening the exhaust-valve, a rider-disk arranged adjacent to the exhaust-cam, a regulator-pawl pivoted on said rock-arm and adapted to engage with the face of the rider-disk for holding the roller or bearing-piece out of engagement with the receding portion of the exhaust-cam, a spring whereby the regulator-pawl is yieldingly held in engagement with the face of the rider-disk, and a trip-cam whereby the regulator-pawl is disengaged from the face of the rider-disk for permitting the roller or bearing-piece to engage with the receding portion of the exhaust-cam and closing the exhaust-valve, substantially as set forth.

14. The combination with the cylinder, the piston and the exhaust-valve, of a rock-arm connected with the exhaust-valve and provided with a roller or bearing-piece and with a stop-lug, a rotary exhaust-cam engaging with said roller or bearing-piece and having a salient portion for moving said rock-arm forward and opening the exhaust-valve and a receding portion which permits the rock-arm to move backwardly for opening the exhaust-valve, a rider-disk arranged adjacent to the exhaust-cam, a regulator-pawl pivoted on said rock-arm and adapted to engage with one side against the face of the rider-disk for holding the roller or bearing-piece out of engagement with the receding portion of the exhaust-cam and bearing with its opposite side against the stop-lug, a spring whereby the regulator-pawl is held against said lug, a spring whereby the regulator-pawl is yieldingly held in engagement with the face of the rider-disk and a trip-cam whereby the regulator-pawl is disengaged from the face of the rider-disk for permitting the roller or bearing-piece to engage with the receding portion of the exhaust-cam and closing the exhaust-valve, substantially as set forth.

15. The combination with the cylinder, the piston and the exhaust-valve, of a roller or bearing-piece connected with the exhaust-valve, an exhaust-cam engaging with said roller or bearing-piece, a rotary rider-disk arranged adjacent to said exhaust-cam, a regulator-pawl connected with the roller or bearing-piece and adapted to engage with the rider-disk, a movable trip-cam arranged on the rider-disk and adapted to disengage the regulator-pawl from the face of the rider-disk, a centrifugal weight-lever connected with the trip-cam and adapted to move the trip-cam into an inoperative position and a spring whereby the trip-cam is yieldingly held in its operative position, substantially as set forth.

16. The combination with the cylinder, the piston and the exhaust-valve, of a roller or bearing-piece connected with the exhaust-valve, an exhaust-cam engaging with said roller or bearing-piece, a rotary rider-disk arranged adjacent to the exhaust-cam, a regulator-pawl connected with the roller or bearing-piece and adapted to engage with the rider-disk, a trip-cam adapted to disengage said pawl from the face of the rider-disk and pivoted with its rear end adjacent to the rider-disk, a centrifugal weight-lever connected with its front end to the pivot of the trip-cam and a return-spring connected with the weight-lever, substantially as set forth.

17. The combination with the cylinder, the piston and the exhaust-valve, of a roller or bearing-piece connected with the exhaust-valve, an exhaust-cam engaging with said roller or bearing-piece, a rotary rider-disk arranged adjacent to the exhaust-cam, a regulator-pawl connected with the roller or bearing-piece and adapted to engage with the rider-disk, a trip-cam adapted to disengage said pawl from the face of the rider-disk and pivoted adjacent to the rider-disk, a centrifugal weight-lever yieldingly connected with said trip-cam and a return-spring connected with the weight-lever, substantially as set forth.

18. The combination with the cylinder, the piston, and the exhaust-valve, of a roller or bearing-piece connected with the exhaust-valve, an exhaust-cam engaging with said roller or bearing-piece, a rotary rider-disk arranged adjacent to said exhaust-cam, a regulator-pawl connected with the roller or bearing-piece and adapted to engage with the rider-disk, a trip-cam adapted to disengage said pawl from the face of the rider-disk and secured with its rear end to a wrist-pin which is pivoted adjacent to the rider-disk, a weight-lever mounted loosely with its front end on said wrist-pin and provided with a radial slot, a pin secured to said wrist-pin and passing through said slot, and a spring secured with its ends to the weight-lever and said pin, substantially as set forth.

19. The combination with the cylinder, the piston and the exhaust-valve, of a roller or bearing-piece connected with the exhaust-valve, a supporting-wheel journaled on an arbor and provided with an exhaust-cam engaging with said roller or bearing-piece, a rider-disk secured to said wheel, a regulator-pawl secured to the roller or bearing-piece and adapted to engage with the face of the rider-disk, a trip-cam adapted to disengage the regulator-pawl from the face of the rider-disk and secured with its rear end to a wrist-pin which is pivoted in the supporting-wheel, a weight-lever mounted on said wrist-pin a spring for moving said weight-lever inwardly and an adjusting-screw arranged axially in the arbor and adapted to adjust the tension of the return-spring, substantially as set forth.

20. The combination with the cylinder, the piston and the exhaust-valve, of a roller or bearing-piece connected with the exhaust-valve, a supporting-wheel journaled on an arbor and provided with an exhaust-cam engaging with said roller or bearing-piece, a rider-disk secured to said wheel, a regulator-pawl, secured to the roller or bearing-piece and adapted to engage with the face of the rider-disk, a trip-cam adapted to disengage the regulator-pawl from the face of the rider-disk, weight-levers arranged on the supporting-wheel on opposite sides of its pivots, a rod connecting said weight-levers, a wrist-pin pivoted in the supporting-wheel and connecting the front end of one of said levers with the rear end of the trip-cam, a return-spring secured with one end to the other weight-lever, an elbow-lever pivoted on the supporting-wheel and having one of its arms connected with the return-spring, and an adjusting-screw arranged axially in the arbor and engaging with the other arm of the elbow-lever, substantially as set forth.

21. The combination with the cylinder, the piston and the exhaust-valve, of a cam having a salient portion whereby the exhaust-valve is held open during the exhaust-stroke of the piston, and a receding portion whereby the exhaust-valve is permitted to close during the suction, compression and working strokes of the piston and a movable starting-cam capable of being projected beyond the face of said receding portion for holding the exhaust-valve open during a portion of the compression-stroke of the piston, substantially as set forth.

22. The combination with the cylinder, the piston and the exhaust-valve, of a supporting-wheel provided with an exhaust-cam having a salient portion whereby the exhaust-valve is held open during the exhaust-stroke of the piston, and a receding portion whereby the exhaust-valve is permitted to close during the suction, compression and working strokes of the piston, a starting-cam pivoted on the supporting-wheel and adapted to be projected beyond the face of the receding portion of the exhaust-cam or to be retracted, a turn-button pivoted on the supporting-wheel and adapted to hold the starting-cam in its projected position, and a spring whereby the starting-cam is retracted when released by the turn-button, substantially as set forth.

Witness my hand this 28th day of September, 1895.

FRED C. OLIN.

Witnesses:
 THEO. L. POPP,
 KATHRYN ELMORE.